July 10, 1962 — M. B. REYNOLDS — 3,043,761
NUCLEAR REACTOR FUEL
Filed Sept. 23, 1958
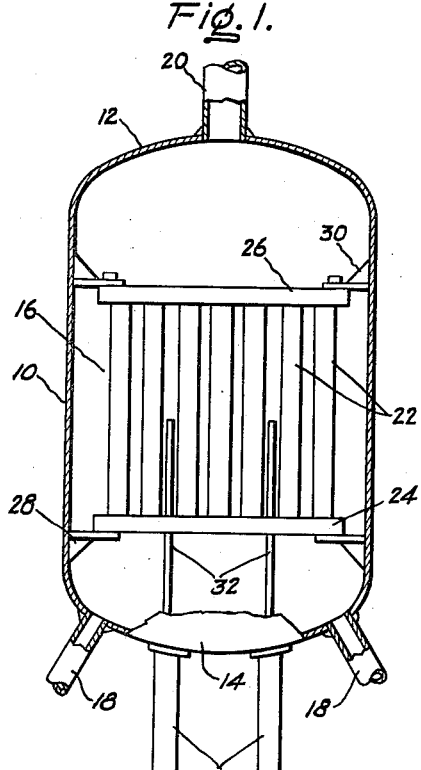
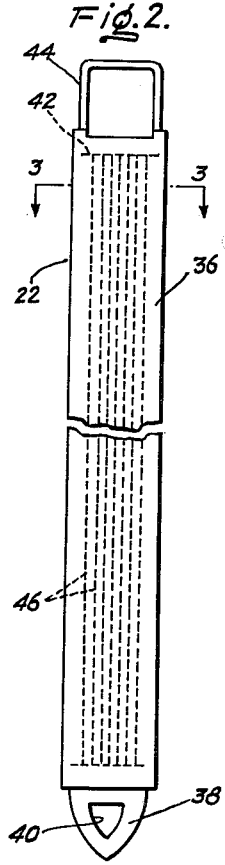
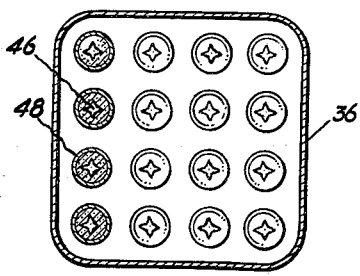
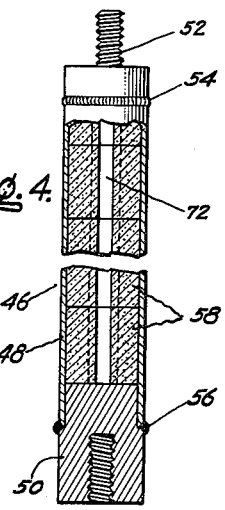
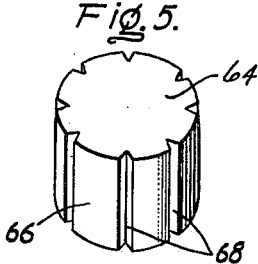
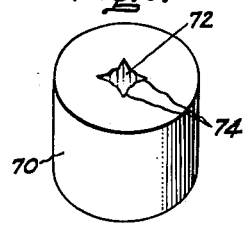
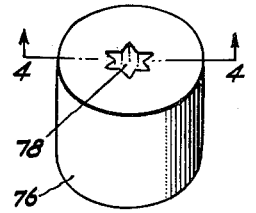
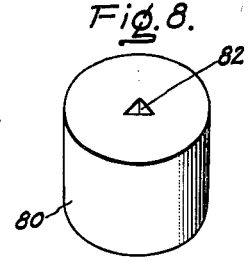
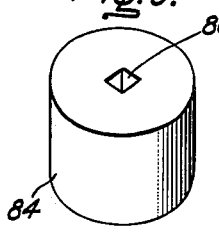
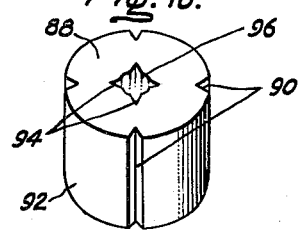
INVENTOR.
MYRON B. REYNOLDS,
BY
ATTORNEY.

United States Patent Office 3,043,761
Patented July 10, 1962

3,043,761
NUCLEAR REACTOR FUEL
Myron B. Reynolds, Alamo, Calif., assignor to General Electric Company, a corporation of New York
Filed Sept. 23, 1958, Ser. No. 762,892
12 Claims. (Cl. 204—193.2)

This invention relates to the liberation of energy in nuclear reactors and more particularly relates to an improved nuclear fuel solid for use in the fuel elements and assemblies of such a nuclear reactor and in which loss of thermal conductivity due to random fracturing of the fuel material is overcome.

The release of large amounts of energy through nuclear fission reactions is now quite well known. In general, a fissionable atom such as $U^{233}$, $U^{235}$, or $Pu^{239}$ absorbs a neutron in its nucleus and undergoes a nuclear disintegration. This produces on the average, two fission products of lower atomic weight and great kinetic energy, and from 2 to 3 neutrons also of high energy. For example, the fission of $U^{235}$ produces a light fission product and a heavy fission product with mass numbers ranging between 80 and 110 and between 125 and 155 respectively, and an average of 2.5 neutrons. The energy release approaches about 200 mev. (million electron volts) per fission.

The kinetic energy of the fission products is quickly dissipated in the fuel as heat. If after this heat generation there is at least one net neutron remaining which induces a subsequent fission, the fission reaction becomes self-sustaining and the heat generation is continuous. The heat is removed by recirculating a coolant through heat exchange relationship with the fuel and a heat sink. The reaction may be continued as long as sufficient fissionable material remains in the fuel to override the effects of the fission products and other neutron absorbers which also may be present.

In order to maintain such fission reactions at a rate sufficient to generate useful quantities of thermal energy, nuclear reactors are presently being designed, constructed, and operated in which the fissionable material or nuclear fuel is contained in fuel elements which may have various shapes, such as plates, tubes, or rods. These fuel elements are usually provided, on their external surfaces, with a corrosion resistant non-reactive cladding which contains no fissionable or fertile material. The elements are grouped together at fixed distances from each other in a coolant flow channel or region as a fuel assembly, and a sufficient number of such fuel assemblies are combined to form the nuclear reactor core capable of the self-sustained fission reaction referred to above. The core is usually enclosed within a reactor vessel through which a coolant is circulated.

The cladding serves two primary purposes; first, to resist any chemical reaction between the nuclear fuel and either the coolant or moderator if present, or both, and second, to prevent highly radioactive fission products from being released from the fuel into the coolant or moderator or both. Common cladding materials are stainless steel, aluminum and its alloys, zirconium and its alloys, and others. The failure of the cladding and resultant fission product release can contaminate the coolant or moderator and the coolant system with intensely radioactive long-lived products to a degree which interferes with plant operation.

Various elemental and compound forms of the known fissionable isotopes may be employed as nuclear reactor fuel. The particularly desirable forms include those materials which are physically and chemically stable under the temperature, pressure, chemical, and irradiation conditions encountered. One particularly desirable form from these standpoints, is the so-called ceramic or refractory type. A typical ceramic uranium fuel is uranium dioxide ($UO_2$). It is chemically inert in the presence of heated or boiling water and steam, and is dimensionally stable in the presence of the intense neutron and gamma irradiation characteristic of nuclear reactors. The ceramic fuels in general and $UO_2$ in particular, have relatively low thermal conductivities on the order of 1.0 B.t.u./hr./sq. ft./°F./ft. However, these materials have exceedingly high melting points, the melting point of $UO_2$ being about 5,000° F.

In high performance nuclear reactors, the highest heat transfer rate possible is maintained from the nuclear fuel into the reactor coolant, and this requires the maintenance of temperatures within the fuel frequently very close to the melting point. The variation of fuel temperature along a line at right angles through the center line of the fuel element is approximately parabolic. With temperatures at the center of the fuel element close to 5,000° F. and coolant temperatures nearly always below about 1,000° F., very high temperature gradients, as well as changes in the gradients with time as a function of changes of power level of the reactor, generate thermal stresses in the solid which are believed to be responsible for random cracking or fracturing of the solid fuel.

From a nuclear physics standpoint, the only requirements with respect to the fuel are that there be no change in either (1) the linear distribution of fissionable and fertile atoms throughout the fuel mass, or (2) the external dimensions of the fuel during operation. On these parameters fuel solid cracking has little, if any, direct effect. However, indirect effects result from fuel cracking due to heat transfer considerations. Random fracture surfaces extending through the solid fuel present a high thermal resistance to heat flow when the fracture surface is not parallel to the temperature gradient in the fuel. The high thermal resistance is due to the break in the conductive heat flow path and the accumulation in the fracture of a film of gas, which is either added during manufacture or generated during operation of the fuel. Maintenance of the same heat generation rate as before fracture invariably leads to higher and higher fuel temperatures, which in turn lead to central melting of the $UO_2$ fuel, and this may be directly responsible for changes in the linear distribution of fuel atoms and in the dimensions of the fuel.

Heretofore, there has been no known solution to this problem of nuclear fuel solid fracturing and the resultant degradation of heat transfer properties of the fuel.

It is accordingly a primary object of this invention to provide an improved nuclear fuel solid of a design which prevents the formation of random fractures which are other than substantially parallel to the heat conduction direction and thus preserves the thermal conductivity of the fuel.

It is a specific object of this invention to provide a nuclear fuel solid in which controlled cracking is induced substantially solely along surfaces which are parallel to the heat conduction direction at points on said surface and in which the previously encountered adverse affects of random cracking upon thermal conductivity of the fuel solid are avoided.

Other objects and advantages of the present invention will be apparent to those skilled in the art as the description and illustration thereof proceed.

Briefly, the present invention comprises a nuclear fuel solid provided with a plurality of longitudinal V-shaped grooves of acute included angle disposed along the surface of the solid. The fuel solid may be in the form of a relatively short pellet, a relatively long extrusion, or other form. The grooves referred to extend along a surface of the fuel solid in a direction parallel to its longitudinal axis. Fuel solids whose lateral surface is provided with the grooves according to the present invention have been found to be free of the random cracking or fracturing characteristic of ungrooved fuel solids which are otherwise of the same dimensions. The presence of the grooves generates locally increased thermal stresses which are believed to be responsible for the controlled cracking of the fuel solid generally along a surface intersecting the longitudinal groove and the longitudinal axis of the fuel solid and parallel to the temperature gradient in the fuel solid according to this invention.

In a right circular cylindrical fuel solid provided with the longitudinal grooves according to this invention, the only cracking which occurs produces radial longitudinal surfaces converting the fuel solid into a segmented structure consisting of several pie-shaped mating pieces of various size. The heat transfer direction is radial in each pie-shaped piece, and thus the heat flowing does not intersect and is in no way impeded by the fracture surface or surfaces which may be present. The absence of random fractures in the fuel solid embodying this invention permits continued maintenance of high heat transfer rates through the fuel to its heat transfer surface or surfaces and prevents increased internal temperatures otherwise caused by such fractures in the conventional fuel.

The present invention will be more readily understood by reference to the accompanying drawings in which:

FIGURE 1 is a schematic elevation view in partial cross section of a nuclear reactor containing a plurality of fuel assemblies, FIGURE 2 is an elevation view of a typical fuel assembly containing a bundle of nuclear fuel rods, FIGURE 3 is a cross-section view of the fuel assembly shown in FIGURE 2, FIGURE 4 is a detailed elevation view in partial cross-section of a typical fuel rod, FIGURES 5 through 10 are isometric views of nuclear fuel solids provided with the longitudinal V-shaped grooves according to the invention.

Referring now more particularly to FIGURE 1, reactor vessel 10 is provided with upper and lower hemispherical heads 12 and 14 to enclose reactor core 16. The vessel is provided with coolant inlet and outlet 18 and 20 by means of which a coolant is recirculated through the vessel to absorb and remove from core 16 the liberated heat. The reactor core 16 is composed of a plurality of vertically supported parallel fuel assemblies 22 which rest on lower support grid 24 and are positioned at their upper ends by means of upper grid guide 26. Suitable brackets 28 and 30 maintain the core support grid 24 and grid guide 26 in fixed positions.

The rate of heat liberation is controlled by means of control rods 32 which extend upwardly into core 16 and are composed of a neutron absorber or poison such as boron, cadmium, certain rare earth metals, or various alloys and compounds thereof with other elements. The position of control rods 32 in the core is controlled by a control rod drive contained within control rod drive housing 34.

In FIGURE 2 an elevation view of fuel assembly 22 is shown consisting of fuel channel 36, a lower nose piece 38 provided with at least one coolant opening 40, upper end piece 42 through which the heated coolant flows, and assembly lifting bail 44. A plurality of parallel fuel rods 46 are indicated within channel 36.

In FIGURE 3 a transverse cross-section view of FIGURE 2 is shown, showing the square cross-section of channel 36 and a 4 x 4 array of fuel rods 46, each provided with an external cladding 48.

In FIGURE 4 an enlarged view in partial cross-section of a typical fuel rod segment is shown. This fuel rod is provided with cladding 48 and with threaded end connectors 50 and 52 welded at 54 and 56 to each end of the cladding. Enclosed within the cladding is a plurality of individual solids or pellets 58.

In FIGURES 5 through 10 are shown isometric views of various forms of fuel solids provided with the longitudinal V-shaped grooves of acute included angle according to this invention. Although each of these views shows a fuel solid having the general geometric form of a right circular cylinder whose diameter is approximately equal to its length, the present invention may be embodied in other solid geometric forms having non-circular cross-sections or greater length to diameter ratios, or both, as hereinafter discussed.

In FIGURE 5 the fuel solid 64 is provided longitudinally along its external surface 66 with a plurality of V-shaped grooves 68 uniformly spaced 45° apart from one another. Obviously, depending upon the size of the fuel pellet, a fewer or a greater number of such grooves may be employed.

In FIGURE 6 fuel solid 70 is shown provided with a central channel 72 of essentially circular cross-section which extends along the longitudinal axis of the pellet. This central channel is provided with four V-shaped grooves 74 spaced 90° apart around the inner surface thus formed.

In FIGURE 7 fuel solid 76 is shown provided with a central channel 78 which is of "star"-shaped cross-section. This particular central channel provides six V-shaped grooves, but a greater or smaller number may be employed.

In FIGURE 8 fuel solid 80 is shown provided with a central channel 82 of triangular shaped cross-section, the included angles being the 60° angles characteristic of an equilateral triangle.

In FIGURE 9 fuel solid 84 is shown provided with a central channel 86 of square cross-section. The four included angles of 90° being the limiting case for the V-shaped grooves of acute included angle according to this invention.

Referring finally to FIGURE 10, fuel solid 88 is shown which comprises a combination of the two embodiments of this invention shown in FIGURES 5 and 6, that is, a fuel solid utilizing simultaneously a plurality of grooves 90 on its exterior surface 92 and a plurality of grooves 94 on the internal surface of central channel 96.

Various other physical embodiments of this invention will be apparent to those skilled in the art from the preceding description and illustration.

As indicated previously, and now with particular reference to FIGURES 5 through 10, the controlled fracturing of the fuel solids of this invention occurs essentially along a radial surface which simultaneously intersects the apex of the particular fuel solid groove and the longitudinal axis of the fuel solid. In FIGURE 10, for example, a fracture surface which forms during irradiation extends radially in the solid between corresponding inner and outer grooves 94 and 90, respectively. These fracture surfaces are all substantially parallel to the heat flow direction. No random fracturing has been found to occur during extensive testing of these fuel solid geometries, and no impedence of heat transfer results from the controlled "radial" fuel solid fracturing which does occur.

Although the typical embodiments shown in FIGURES 3 through 10 described above all illustrate fuel solids of circular cross-section, it should be understood that other prismatic solid shapes having regular or irregular polygonal geometric cross-sections may be employed where desired. For example, fuel elements of square, hexagonal, octagonal or other cross-section may be used. In such cases, the longitudinal grooves according to this invention when placed on the exterior surface of such prisms, may be placed either at the intersection of the exterior plane surfaces, or substantially along the longitudinal center line of each such surface, or both. In the present specification, the terms "prism" and "prismatic" as applied to the nuclear fuel solids of this invention, are intended to include solid or hollow rods of circular or non-circular cross-section, since the cross-sections shown enclosed within a circular or non-circular curve are simply the limiting cases for regular or irregular polygonal cross-sections having an infinite number of sides.

It is preferred that the volume of the longitudinally grooved fuel solids, according to this invention, be not over 5 percent less than the volume of the corresponding ungrooved shape. It has been found that groove volumes as low as about 0.5 percent are sufficient to induce radial cracking and to prevent random cracking of the fuel solid. Although groove volumes greater than about 5 percent do not inhibit radial crack formation, such a high volume does reduce the equivalent fuel density in the reactor and is responsible for higher required enrichment and increased core sizes for a given power generation.

The minimum number of longitudinal grooves in each fuel solid is about three, and preferably from five to eight such longitudinal grooves should be used. In this range apparently the thermal stresses in each resulting pie-shaped fragment are reduced to the point that random cracking of the fragments does not occur.

The maximum included angle of the longitudinal grooves in the fuel according to this invention, is 90°, and acute included angles ranging from about 20° to about 70° are preferred. Included angles larger than 90° do not appear to increase local stresses sufficiently at the apex of the groove to insure the complete absence of random cracking, whereas more than about three grooves with acute included angles appear to be uniformly effective.

As an example of the preparation of fuel element solids embodying the present invention, the following information is given:

*Example I*

Commercial $UO_2$ powder containing about 1.5 percent $U^{235}O_2$ was mixed with about 4 percent to 5 percent by weight of a stearic acid binder and thoroughly mixed until uniform. This mixture was fed to an extrusion press from which elongated extrusions having a nominal diameter of 0.5 inch and lengths ranging from 3 to 5 inches were produced. By means of a corresponding extrusion die, these extrusions were provided with six V-shaped longitudinal grooves of 45° included angle and of 0.040 inch radial depth uniformly spaced 60° apart from one another around the outer surface of the fuel solid. The extrusion die had correspondingly sized and shaped inward projections. The aggregate volume of these grooves was about 1 percent of the ungrooved fuel solid.

These green or unsintered extrusions had an apparent density of 5.5 grams per cubic centimeter. The extrusions were then loaded into refractory containers containing aluminum oxide "sand" and were slowly heated to a temperature of about 700° F. in a nitrogen atmosphere for about 120 minutes to volatilize the moisture and the binder. Subsequently, the extrusions were further heated to a temperature of about 3100° F. for four hours in a hydrogen atmosphere. The sintered extrusions were slowly cooled, and upon examination were found to have an apparent density of about 10.5 grams per cubic centimeter or about 95 percent of theoretical.

*Example II*

As another example of the present invention, the uniform $UO_2$ binder mixture described above was fed to a punch press to produce pellets 0.5 inch in length and diameter and provided with central channel of six-pointed "star"-shaped cross-section as shown in FIGURE 7. The channel volume was about 2.5 percent of the volume of the solid pellet, the V-shaped grooves were of 35° included angle and were about 0.040 inch in radial depth. They were sintered in the same manner as described above and had about 95 percent of theoretical $UO_2$ density of 10.97 grams per cubic centimeter.

*Example III*

The embodiments shown in FIGURES 6 and 8–10 as well as others, may be similarly produced.

*Example IV*

In thermal testing the longitudinally grooved geometric shapes embodying this invention, internally grooved cylindrical pellets corresponding to FIGURE 7 were gradually heated to a temperature of about 2,000° F. and were then dropped into a container of water and quench chilled to about 75° F. The fragments produced were uniformly pie-shaped segments of the original pellet. No random cracking was noted.

*Example V*

The same controlled fracturing was noted upon quench chilling pellets having external grooves as shown in FIGURE 5.

*Example VI*

Ungrooved cylindrical pellets of the same material prepared and pressed under identical conditions and sintered simultaneously were also heated to about 2,000° F. and quench chilled to about 75° F. The resulting fractured particles were of random shape, nearly always showing fracture surfaces which were other than parallel to the pellet radius or heat transfer direction.

*Example VII*

A nuclear fuel rod about 36″ long was prepared from commercial $UO_2$ powder of 1.5 percent enrichment. The rod diameter was 0.50″ and was made up of a series of alternate ungrooved cylindrical pellets and pellets which were grooved on their interior surface as shown in FIGURE 7. The grooved pellets were provided with a central channel having a 6-pointed "star"-shaped cross-section according to Example II. This fuel rod was irradiated in a power reactor moderated and cooled with light water boiling at 1,000 p.s.i.a. and about 545° F. moderator temperature. Under conditions of the highest power generation, which was 30 thermal M.W., it is estimated that the interior temperature of this fuel rod was about 4,000° F. Subsequent removal of this fuel element and examination of the fuel pellets indicated that the ungrooved cylindrical pellets exhibited extensive random fracturing whereas the grooved fuel pellets embodying the present invention exhibited no random cracking, the fractures being confined to radial fractures parallel to the heat flow direction. No substantial movement or deformation of the cladding was noted in the region of the grooved pellets.

The present invention has been described and illustarted in several embodiments and tests have been described in connection with $UO_2$ fuel. This is not to be considered as a limitation since present invention may as readily be applied using other fuel materials including frangible metals or elemental fuel forms such as thorium and plutonium, as well as alloys, mixtures, and compounds of such fuel materials such as the oxides, carbides, silicides, and other frangible refractory compounds of relatively low thermal conductivity.

A particular embodiment of this invention has been described in considerable detail by way of illustration. It should be understood that various other modifications and adaptations thereof may be made by those skilled in this particular art without departing from the spirit and scope of this invention as set forth in the following claims.

I claim:

1. A frangible refractory nuclear fuel solid of low thermal conductivity provided with a plurality of longitudinal V-shaped grooves of acute included angles along a surface thereof to induce fracturing of said solid along surfaces parallel to the temperature gradient induced in said solid during irradiation.

2. A nuclear fuel solid which comprises a frangible ceramic body provided with a plurality of V-shaped grooves of acute included angle disposed longitudinally along a surface thereof.

3. A nuclear fuel solid which comprises a frangible ceramic body provided with a plurality of longitudinal V-shaped grooves of acute included angle disposed in a lateral surface thereof to prevent random fracturing of said solid and the formation of fracture surfaces which are other than substantially parallel to the heat conduction direction therethrough.

4. A nuclear fuel solid which comprises a frangible ceramic body adapted to resist random fracturing during irradiation and which is provided with a plurality of at least three longitudinal V-shaped grooves of acute included angle substantially uniformly spaced apart from one another on a lateral surface of said solid, the total volume of the grooved solid being between about 0.5 percent and about 5.0 percent less than the volume of the corresponding ungrooved solid.

5. A nuclear fuel solid which comprises a frangible ceramic body of prismatic geometry provided in a lateral surface with a plurality of longitudinal V-shaped grooves of acute included angle to permit fracturing of said solid along at least one fracture surface which is substantially parallel to the heat conduction direction at points on said fracture surface.

6. A nuclear fuel solid which comprises a frangible ceramic body of prismatic geometric shape provided with a channel along the longitudinal axis of said solid, said solid having a plurality of longitudinal V-shaped grooves of acute included angle disposed along the wall of said channel.

7. A nuclear fuel solid which comprises a frangible ceramic body of prismatic geometric shape provided in its outer surface with a plurality of longiudinal V-shaped grooves of acute included angle.

8. A nuclear fuel solid which comprises a frangible ceramic body of prismatic geometric shape having a channel extending along the longitudinal axis thereof and a plurality of longitudinal V-shaped grooves of acute included angle disposed along the outer surface of said solid and along the wall of said channel.

9. An improved nuclear fuel element which comprises an elongated body of frangible ceramic material having a regular geometric cross section and a prismatic shape, said body having a plurality of longitudinal V-shaped grooves of acute included angle substantially uniformly spaced apart from one another on a lateral surface of said body to induce fracturing during irradiation of said body along surfaces substantially parallel to the heat conduction direction in said body at points on the fracture surface, and a corrosion resistant non-reactive cladding enclosing said body and immediately adjacent the external surface thereof.

10. A fuel element according to claim 9 wherein said grooves in said body are parallel to and substantially equally spaced apart from the longitudinal axis of said body to induce controlled fracturing of said body generally along a surface intersecting said groove and said axis during irradiation.

11. A fuel element according to claim 9 wherein said body has a substantially circular cross section and said body fractures radially during irradiation into a segmented structure within said cladding consisting of a plurality of mating pieces of pie-shaped cross section.

12. A fuel element according to claim 9 wherein said frangible ceramic material is selected from group consisting of the oxides, carbides, and silicides of uranium, thorium, and plutonium.

References Cited in the file of this patent

UNITED STATES PATENTS

| | | |
|---|---|---|
| 2,725,288 | Dodds et al. | Nov. 29, 1955 |
| 2,856,340 | Wigner | Oct. 14, 1958 |

FOREIGN PATENTS

| | | |
|---|---|---|
| 1,126,414 | France | July 30, 1956 |
| 1,141,542 | France | May 27, 1958 |

OTHER REFERENCES

BMI–1053 Nov. 10, 1955.
BMI–983 Feb. 21, 1955.